(12) United States Patent
Ohara et al.

(10) Patent No.: US 9,944,762 B2
(45) Date of Patent: Apr. 17, 2018

(54) METHOD FOR PRODUCING CHLORINATED POLYVINYL CHLORIDE RESIN

(71) Applicant: KANEKA CORPORATION, Osaka-shi, Osaka (JP)

(72) Inventors: Daichi Ohara, Takasago (JP); Takehiro Nakaseki, Takasago (JP)

(73) Assignee: KANEKA CORPORATION, Osaka-Shi, Osaka (JP)

( * ) Notice: Subject to any disclaimer, the term of this patent is extended or adjusted under 35 U.S.C. 154(b) by 0 days.

(21) Appl. No.: 14/413,596

(22) PCT Filed: Apr. 28, 2014

(86) PCT No.: PCT/JP2014/061870
§ 371 (c)(1),
(2) Date: Jan. 8, 2015

(87) PCT Pub. No.: WO2014/178374
PCT Pub. Date: Nov. 6, 2014

(65) Prior Publication Data
US 2015/0203640 A1  Jul. 23, 2015

(30) Foreign Application Priority Data
May 2, 2013  (JP) ................. 2013-097027

(51) Int. Cl.
*B01J 19/12* (2006.01)
*C08J 3/28* (2006.01)
(Continued)

(52) U.S. Cl.
CPC ............. *C08J 3/28* (2013.01); *B01J 19/123* (2013.01); *C08F 2/48* (2013.01); *C08F 8/22* (2013.01); *C08F 14/06* (2013.01); *C08J 2327/24* (2013.01)

(58) Field of Classification Search
CPC .......... C08J 3/28; C08J 2327/24; C08F 14/06; C08F 8/22; C08F 2/48; B01J 19/123
(Continued)

(56) References Cited

U.S. PATENT DOCUMENTS 2,996,489 A * 8/1961 Dannis ................ B03C 3/011
522/132
3,700,632 A * 10/1972 Beale et al. ............... B01J 8/24
522/132
(Continued)

FOREIGN PATENT DOCUMENTS

EP        1361231 A1    11/2003
EP     2 778 180 A1     9/2014
(Continued)

OTHER PUBLICATIONS

Zuo et al, "The Near-UV Absorption Constants for Nitrite Ion in Aqueous Solution," Chemosphere vol. 36, No. 1, pp. 181-188, 1998.*
(Continued)

*Primary Examiner* — Keith D. Hendricks
*Assistant Examiner* — Colleen M Raphael
(74) *Attorney, Agent, or Firm* — Birch, Stewart, Kolasch & Birch, LLP

(57) ABSTRACT

The present invention relates to a method for producing chlorinated polyvinyl chloride resin in which polyvinyl chloride resin is chlorinated by radiating ultraviolet light in a reactor into which polyvinyl chloride resin and chlorine have been introduced, wherein the radiation of the ultraviolet light is performed by using at least one light source selected from the group consisting of an ultraviolet LED, an organic EL and an inorganic EL, the light source is disposed within the reactor, at least one radiation direction of the ultraviolet light is within a range of 30° or more and 115° or
(Continued)

less with respect to a stirring direction of polyvinyl chloride resin, and an amount of ultraviolet light radiated within the range of 30° or more and 115° or less with respect to the stirring direction of polyvinyl chloride resin is 24% or more based on a total amount of ultraviolet light radiated from the light source taken as 100%.

10 Claims, 6 Drawing Sheets

(51) Int. Cl.
    *C08F 14/06* (2006.01)
    *C08F 8/22* (2006.01)
    *C08F 2/48* (2006.01)
(58) Field of Classification Search
    USPC .................................. 204/158.12, 157.94
    See application file for complete search history.

(56) References Cited

U.S. PATENT DOCUMENTS

| | | | | |
|---|---|---|---|---|
| 4,049,517 A * | 9/1977 | Adachi | ............. | C08F 8/22 522/132 |
| 4,350,798 A * | 9/1982 | Parker | ............. | B01J 19/123 522/132 |
| 4,373,093 A * | 2/1983 | Olson | ............. | C08F 6/12 525/356 |
| 4,377,459 A * | 3/1983 | Parker | ............. | B01J 19/123 522/132 |
| 4,412,898 A * | 11/1983 | Olson | ............. | C08F 8/22 522/132 |
| 4,448,658 A * | 5/1984 | Olson | ............. | C08F 8/22 522/132 |
| 4,459,387 A * | 7/1984 | Parker | ............. | B01J 19/123 522/132 |
| 4,751,392 A * | 6/1988 | Wiesmann | ............. | A61L 2/10 422/24 |
| 4,874,823 A * | 10/1989 | Cinadr | ............. | C08F 8/22 525/329.2 |
| 5,624,573 A * | 4/1997 | Wiesmann | ............. | B01J 19/123 422/186.3 |
| 2004/0048945 A1 | 3/2004 | Ueshima et al. | | |
| 2013/0236353 A1* | 9/2013 | Blechschmidt | ............. | A61L 2/10 422/4 |
| 2014/0309325 A1 | 10/2014 | Inaoka et al. | | |

FOREIGN PATENT DOCUMENTS

| | | | |
|---|---|---|---|
| JP | 63-145305 A | 6/1988 | |
| JP | 10-279627 A | 10/1998 | |
| JP | 2002-275213 A | 9/2002 | |
| JP | 2008-31265 A | 2/2008 | |
| WO | WO 2013/069542 A1 | 5/2013 | |

OTHER PUBLICATIONS

Mack et al, "Photochemistry of nitrite and nitrate in aqueous solution: a review," J. of Photochem. and Photobio. A: Chemistry 128 (1999) pp. 1-13.*

International Search Report, dated Jun. 10, 2014, issued in PCT/JP2014/061870.

Extended European Search Report for European Application No. 14792140.7 dated Jan. 11, 2017.

Yuta Nishina et al., "Bromination of hydrocarbons with CBr4, initiated by light-emitting diode irradiation", Bielstein J. of Org. Chem., vol. 9, Aug. 14, 2013, pp. 1663-1667.

* cited by examiner

METHOD FOR PRODUCING CHLORINATED POLYVINYL CHLORIDE RESIN

TECHNICAL FIELD

The present invention relates to a method for producing chlorinated polyvinyl chloride resin. More specifically, the invention relates to a method for producing chlorinated polyvinyl chloride resin using a photochlorination method.

BACKGROUND ART

Chlorinated polyvinyl chloride resin has a higher heat resistant temperature than that of polyvinyl chloride resin because it is chlorinated. Accordingly, chlorinated polyvinyl chloride resin is used in a wide variety of fields including heat resistant pipes, heat resistant industrial plates, heat resistant films and heat resistant sheets.

Generally, chlorinated polyvinyl chloride resin is produced by chlorinating polyvinyl chloride resin while chlorine is supplied to an aqueous suspension obtained by suspending polyvinyl chloride resin particles in an aqueous medium. In the case where the chlorination is performed by a photochlorination method, ultraviolet radiation using a mercury lamp is usually performed in order to generate chlorine radicals (see, for example, Patent Document 1).

PRIOR ART DOCUMENT

Patent Document

Patent Document 1: JP H10 (1998)-279627 A

SUMMARY OF INVENTION

Problem to be Solved by the Invention

Chlorinated polyvinyl chloride resin, which has an excellent mechanical strength and heat resistance, is used in a wide variety of fields, and thus an improvement in productivity is desired. In order to improve the productivity of chlorinated polyvinyl chloride resin, in the photochlorination method, it is desirable to shorten the reaction time of the chlorination reaction of polyvinyl chloride resin so as to increase the reaction efficiency of the chlorination reaction.

The present invention provides a method for producing chlorinated polyvinyl chloride resin in which the reaction efficiency of the chlorination reaction is higher than a conventional method of photochlorination using a mercury lamp, and that produces chlorinated polyvinyl chloride resin having the same levels of mechanical strength and heat resistance as the chlorinated polyvinyl chloride resin produced by the conventional method.

Means for Solving Problem

The present invention relates to a method for producing chlorinated polyvinyl chloride resin in which polyvinyl chloride resin is chlorinated by radiating ultraviolet light in a reactor into which polyvinyl chloride resin and chlorine have been introduced, wherein the radiation of the ultraviolet light is performed by using at least one light source selected from the group consisting of an ultraviolet LED, an organic EL and an inorganic EL, the light source is disposed within the reactor, at least one radiation direction of the ultraviolet light is within a range of 30° or more and 115° or less with respect to a stirring direction of polyvinyl chloride resin, and an amount of ultraviolet light radiated within the range of 30° or more and 115° or less with respect to the stirring direction of polyvinyl chloride resin is 24% or more based on a total amount of ultraviolet light radiated from the light source taken as 100%.

In the method for producing chlorinated polyvinyl chloride resin according to the present invention, the ultraviolet light radiated by the light source preferably has a peak wavelength range of 290 nm or more and 400 nm or less, and more preferably a peak wavelength range of 350 nm or more and 400 nm or less. Also, it is preferable that the light source is an ultraviolet LED. Also, it is preferable that supply of chlorine to the polyvinyl chloride resin is performed by supply of chlorine to an aqueous suspension of polyvinyl chloride resin.

Effects of the Invention

According to the production method of the present invention, at least one radiation direction of ultraviolet light from at least one light source selected from the group consisting of an ultraviolet LED, an organic EL and an inorganic EL is set to be within a range of 30° or more and 115° or less with respect to the stirring direction of polyvinyl chloride resin, and the amount of ultraviolet light radiated within the range of 30° or more and 115° or less with respect to the stirring direction of polyvinyl chloride resin is set to be 24% or more based on the total amount of ultraviolet light radiated from the light source taken as 100%. With this configuration, the reaction time of chlorination reaction can be shortened, and chlorinated polyvinyl chloride resin having the same levels of mechanical strength and heat resistance as the chlorinated polyvinyl chloride resin produced through a photochlorination method using a mercury lamp can be obtained with high reaction efficiency.

DESCRIPTION OF THE INVENTION

Figure 1:
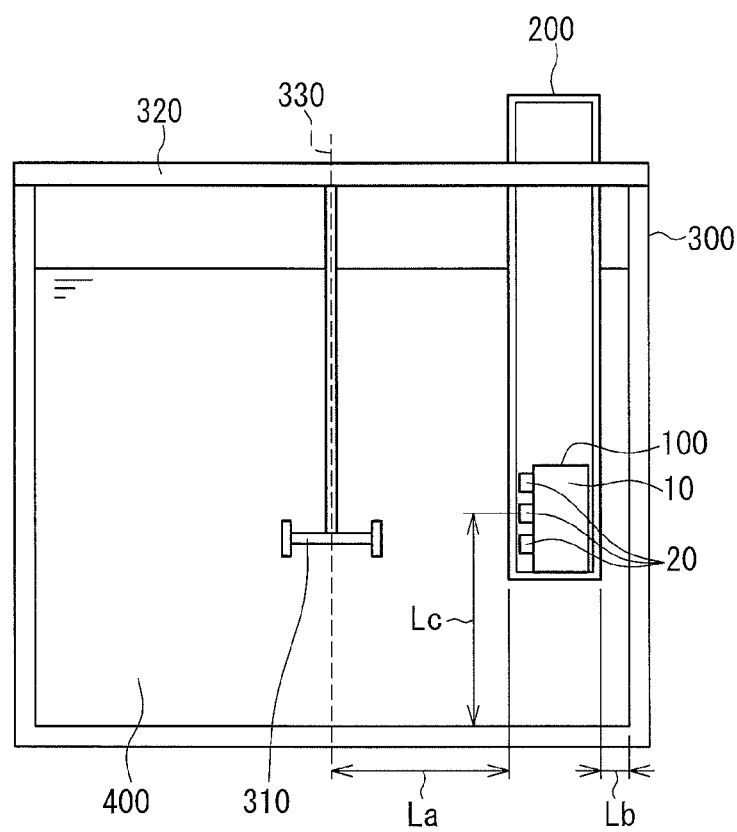
FIG. 1 is a schematic side cross-sectional view of a chlorinated polyvinyl chloride resin producing apparatus according to an example of the present invention.

The present inventors have found that the reaction time of chlorination reaction can be shortened by, in production of chlorinated polyvinyl chloride resin, radiating ultraviolet light in a reactor into which polyvinyl chloride resin and chlorine have been introduced by using at least one light source selected from the group consisting of an ultraviolet LED, an organic EL and an inorganic EL, preferably using an ultraviolet LED, setting at least one radiation direction of ultraviolet light from the light source to be within a range of 30° or more and 115° or less with respect to the stirring direction of polyvinyl chloride resin, and setting the amount of ultraviolet light radiated within the range of 30° or more and 115° or less with respect to the stirring direction of polyvinyl chloride resin to be 24% or more based on the total amount of ultraviolet light radiated from the light source taken as 100%. The present invention has been accomplished based on this finding. If the stirrability in the reactor and the radiation range of ultraviolet light from the light source to polyvinyl chloride resin are the same, ultraviolet radiation using at least one light source selected from the group consisting of an ultraviolet LED, an organic EL and an inorganic EL reduces the total power consumption required in the step of chlorinating polyvinyl chloride resin, and also reduces the production cost as compared to ultraviolet radiation using a mercury lamp. Also, the use of at least one light source selected from the group consisting of an ultraviolet LED, an organic EL and an inorganic EL, particularly the use of an ultraviolet LED improves the productivity of chlorinated polyvinyl chloride resin because the loss in light intensity during long term use is suppressed and the number of replacements of the light source is reduced as compared to a mercury lamp.

In the present invention, at least one radiation direction of ultraviolet light from the light source such as an ultraviolet LED is set to be within a range of 30° or more and 115° or less with respect to the stirring direction of polyvinyl chloride resin. If the number of radiation directions of ultraviolet light is one, it is sufficient that the radiation direction of ultraviolet light is set to be within a range of 30° or more and 115° or less with respect to the stirring direction of polyvinyl chloride resin. If the number of radiation directions of ultraviolet light is two or more, it is sufficient that at least one radiation direction of ultraviolet light is set to be within a range of 30° or more and 115° or less with respect to the stirring direction of polyvinyl chloride resin From the viewpoint of convenience, it is preferable that the number of radiation directions of ultraviolet light is one. From the viewpoint of higher reaction efficiency of the chlorination reaction, at least one radiation direction of ultraviolet light from the light source such as an ultraviolet LED with respect to the stirring direction of polyvinyl chloride resin is preferably 40° or more, more preferably 45° or more, even more preferably 50° or more, even more preferably 55° or more, even more preferably 60° or more, even more preferably 65° or more, even more preferably 70° or more, even more preferably 75° or more, even more preferably 80° or more, even more preferably 85° or more, and even more preferably 90° or more. From the viewpoint of higher reaction efficiency of the chlorination reaction, the at least one radiation direction of ultraviolet light from the light source such as an ultraviolet LED with respect to the stirring direction of polyvinyl chloride resin is preferably 110° or less, more preferably 105° or less, and even more preferably 100° or less. The term "specific radiation direction" as used hereinafter means that the radiation direction of ultraviolet light from the light source such as an ultraviolet LED with respect to the stirring direction of polyvinyl chloride resin is within a range of 30° or more and 115° or less.

In the present invention, the angle of the radiation direction of ultraviolet light with respect to the stirring direction of polyvinyl chloride resin is defined as follows. In a cross section that is perpendicular to the central axis of the reactor and passes through the center point of the light source, a straight line connecting the center point (a point on the central axis of the reactor) of the cross section and the center point of the light source is drawn, and a line that is in contact with the drawn straight line at the right angle at the center point of the light source is defined as a light source center line. Of two contact points where the light source center line is in contact with the outer perimeter of the light source, the contact point that is moved away from the center point of the cross section when the light source is rotated about the center point of the light source along the stirring direction of polyvinyl chloride resin is set as a reference (0°), and on the assumption that the angle increases along the stirring direction of polyvinyl chloride resin, an angle formed between the light source center line and a straight line connecting the center point of the light source and a light source element is defined as the angle of the radiation direction of ultraviolet light with respect to the stirring direction of polyvinyl chloride resin. If there is no light source element on the cross section (hereinafter also referred to as "the central plane of the light source") that is perpendicular to the central axis of the reactor and passes through the center point of the light source, the orthogonal projection of the light source element on the central plane of the light source is defined as the light source element. In the present invention, the center point means the point at the center of the shape, and the central axis means the axis at the center of the shape. The outer perimeter of the light source refers to, if the light source is in the shape (has a cross sectional shape) of a circle or an ellipse, the circumference thereof in the cross section that is perpendicular to the central axis of the reactor and passes through the center point of the light source, and if the light source is in a shape other than a circle or an ellipse such as a rectangle, a square or a triangle, the circumference of the circumcircle of the shape. Also, the light source element refers to an ultraviolet LED element, an organic EL element, or an inorganic EL element. In the present invention, there is no particular limitation on the shape of the reactor, and the reactor may be in the shape of, for example, a cylinder (column), a hexagonal prism, or the like. Also, there is no particular limitation on the shape of the light source, and the light source may be in the shape of, for example, a cylinder (column), a triangular prism, a rectangular prism, a pentagonal prism, a hexagonal prism, or the like. In the present invention, it is preferable that the light source is inserted into a light source protective container and then disposed within the reactor. This prevents corrosion caused by chlorine. There is no particular limitation on the shape of the light source protective container as long as it is capable of accommodating the light source and does not interfere with the ultraviolet radiation from the light source. The light source protective container may be in the shape of, for example, a cylinder (column), a triangular prism, a rectangular prism, a pentagonal prism, a hexagonal prism, or the like.

Figure 6:
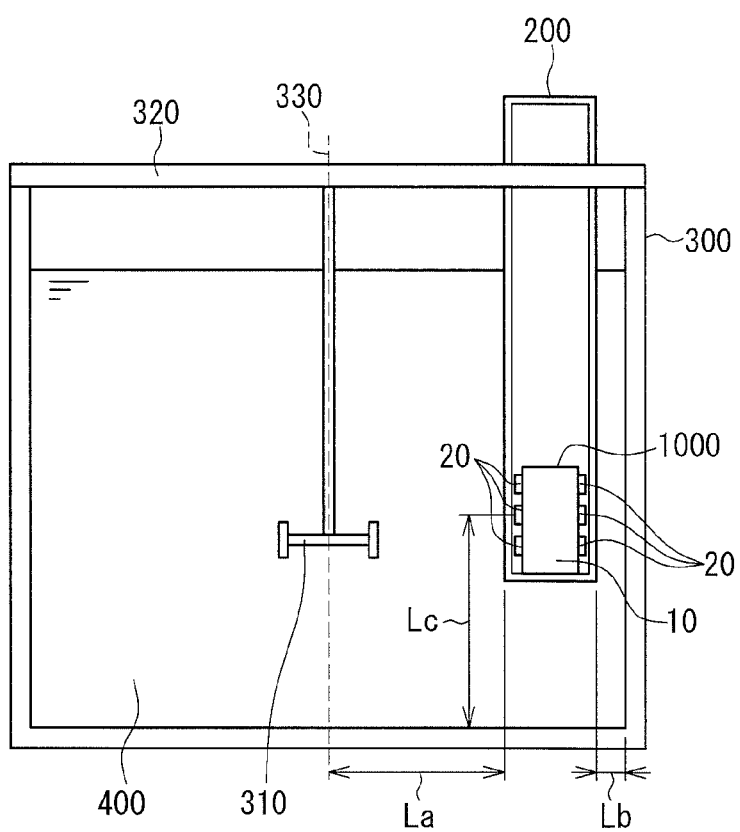
FIG. 6 is a schematic side cross-sectional view of a chlorinated polyvinyl chloride resin producing apparatus used in an example of the present invention.

In the present invention, the amount of ultraviolet light radiated within a range of 30° or more and 115° or less with respect to the stirring direction of polyvinyl chloride resin is 24% or more based on the total amount of ultraviolet light radiated from the light source taken as 100%. In the present invention, "the amount of light" is measured and calculated in the following manner. A sensor (product number UD-36 available from Topcon Positioning Systems, Inc.) is attached to a light amount meter (product number UVR-2 available from Topcon Positioning Systems, Inc.), and the amount of ultraviolet light radiated from the light source per unit area is measured at a position at which the distance between the polyvinyl chloride resin present in the reactor and the light source is the shortest at the time of chlorination reaction. Also, the irradiated area where the ultraviolet light radiated from the light source impinges on polyvinyl chloride resin is measured at the position at which the distance between the polyvinyl chloride resin present in the reactor and the light source is the shortest at the time of chlorination reaction. The value obtained by multiplying the value of the irradiated area obtained by the above measurement by the value of the amount of ultraviolet light per unit area is defined as the amount of light. In the case where, for example, a producing apparatus as shown in FIG. 1 or 6 is used to produce chlorinated polyvinyl chloride resin, the amount of light per unit area and the irradiated area are measured at the position of the outer wall of a light source protective container 200 in which the light source such as an ultraviolet LED light source apparatus is inserted. In the above, the measurement of the amount of light per unit area and the irradiated area is performed in an air atmosphere and in the reactor in an empty state. If the number of radiation directions of ultraviolet light from the light source is one, the amount of ultraviolet light in that radiation direction is the total amount of ultraviolet light radiated from the light source. If the number of radiation directions of ultraviolet light from the light source is more than one, the total of the amounts of ultraviolet light in all radiation directions is the total amount of ultraviolet light radiated from the light source. From the viewpoint of further improving the reaction efficiency of the chlorination reaction, the amount of ultraviolet light radiated within the range of 30° or more and 115° or less with respect to the stirring direction of polyvinyl chloride resin is preferably set to be 25% or more based on the total amount of ultraviolet light radiated from the light source taken as 100%, more preferably 30% or more, even more preferably 35% or more, even more preferably 40% or more, even more preferably 45% or more, even more preferably 50% or more, and even more preferably 55% or more.

Figure 2A:
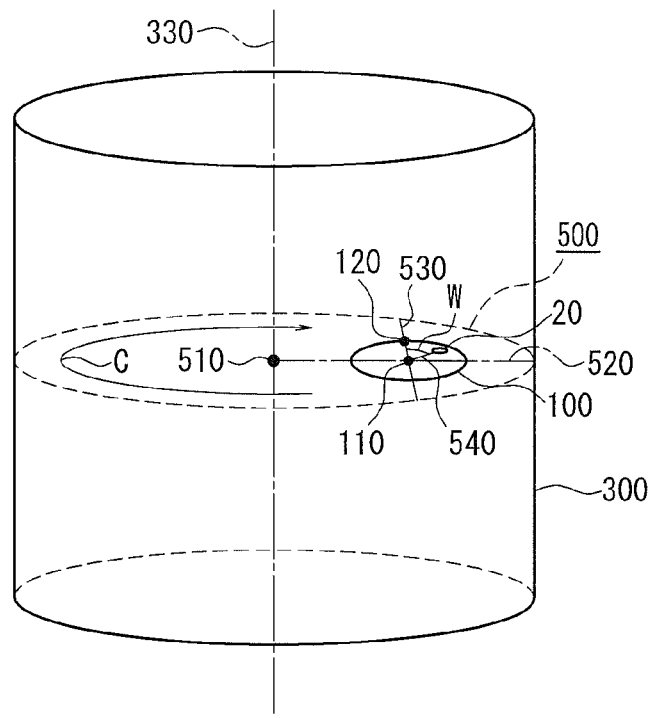
FIG. 2A is a schematic perspective view illustrating the angle of radiation direction of ultraviolet light with respect to the stirring direction of polyvinyl chloride resin in the chlorinated polyvinyl chloride resin producing apparatus according to an example of the present invention.
Figure 2B:
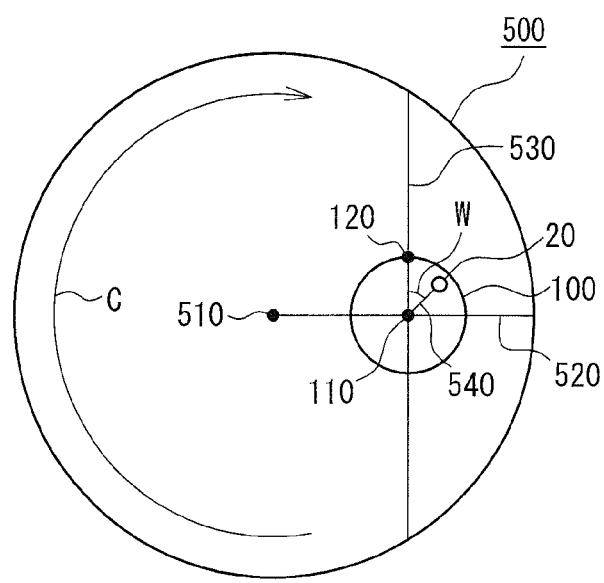
FIG. 2B is a schematic plan view of the same.

The following is a detailed description of the angle of the radiation direction of ultraviolet light with respect to the stirring direction of polyvinyl chloride resin in a chlorinated polyvinyl chloride resin producing apparatus used in an example of the present invention, with reference to FIG. 2. FIG. 2A is a schematic perspective view illustrating the angle of the radiation direction of ultraviolet light with respect to the stirring direction of polyvinyl chloride resin in a chlorinated polyvinyl chloride resin producing apparatus used in an example of the present invention. FIG. 2B is a schematic plan view of the same. In the chlorinated polyvinyl chloride resin producing apparatus, the reactor and the light source are cylindrical (columnar) in shape, and the light source element is an ultraviolet LED element. As shown in FIGS. 2A and 2B, on a cross section 500 that is perpendicular to a central axis 330 of a reactor 300 and passes through a center point 110 of a light source 100, a straight line 520 connecting a center point 510 (a point on the central axis 330 of the reactor) of the cross section 500 and the center point 110 of the light source is drawn, and a line that is in contact with the straight line 520 at the right angle at the center point 110 of the light source is defined as a light source center line 530. Of two contact points where the light source center line 530 is in contact with the perimeter of the light source 100, the contact point 120 that is moved away from the center point 510 of the cross section when the light source 100 is rotated about the center point 110 of the light source along the stirring direction C of polyvinyl chloride resin is set as a reference (0°), and on the assumption that the angle increases along the stirring direction C of polyvinyl chloride resin, an angle W formed between the light source center line 530 and a straight line 540 connecting the center point 110 of the light source and an ultraviolet LED element 20 is defined as the angle of the radiation direction of ultraviolet light with respect to the stirring direction of polyvinyl chloride resin.

In the present invention, the reaction efficiency of the chlorination reaction can be evaluated by the reaction time of the chlorination reaction required until the chlorine content reaches a predetermined value when chlorinated polyvinyl chloride resin having the same chlorine content is produced by using polyvinyl chloride resin of the same composition. If the reaction time of the chlorination reaction required until the chlorine content reaches a predetermined value is shorter, it indicates that the reaction efficiency of the chlorination reaction is higher. In the present invention, the chlorination reaction starts as ultraviolet radiation starts, and ends as the ultraviolet radiation ends.

In the present invention, chlorinated polyvinyl chloride resin is preferably obtained by supplying chlorine to an aqueous suspension of polyvinyl chloride resin and radiating ultraviolet light in a specific radiation direction by using at least one light source selected from the group consisting of an ultraviolet LED, an organic EL and an inorganic EL, so as to chlorinate the polyvinyl chloride resin in the aqueous suspension. The aqueous suspension of polyvinyl chloride resin can be obtained by suspending polyvinyl chloride resin in an aqueous medium. For example, the aqueous suspension of polyvinyl chloride resin can be obtained by mixing polyvinyl chloride resin with water serving as an aqueous medium.

In the present invention, chlorinated polyvinyl chloride resin may be obtained by a method other than the above method of chlorination using an aqueous suspension of polyvinyl chloride resin. That is, chlorinated polyvinyl chloride resin may be obtained by chlorination using a gas phase (gas phase chlorination), or the like. The gas phase chlorination refers to chlorination of polyvinyl chloride resin by radiating ultraviolet light to polyvinyl chloride resin and chlorine by using at least one light source selected from the group consisting of an ultraviolet LED, an organic EL and an inorganic EL while chlorine is injected directly to polyvinyl chloride resin powders.

There is no particular limitation on the ultraviolet LED as long as it is possible to radiate ultraviolet light. In the ultraviolet LED, it is possible to use, for example, a semiconductor light emitting element including a light emitting layer made of a nitride semiconductor material such as AlN, AlGaN, or AlInGaN, a semiconductor light emitting element including a light emitting layer made of a diamond thin film, or the like. Preferably, an ultraviolet LED having a single peak wavelength is used. Also, the peak wavelength of ultraviolet light radiated from the ultraviolet LED can be adjusted by the composition proportion of the light emitting layer. For example, if a nitride semiconductor material is used in the light emitting layer of the ultraviolet LED, the peak wavelength of ultraviolet light becomes shorter as the Al content increases. For ultraviolet radiation, it is possible to use, other than an ultraviolet LED, a light source such as an organic EL or an inorganic EL capable of radiating ultraviolet light. Among them, it is preferable to use an ultraviolet LED as the light source. In the case where a light source such as an organic EL or an inorganic EL is used, it is preferable that the light source radiates ultraviolet light having the same peak wavelength and/or wavelength range as the ultraviolet light radiated by an ultraviolet LED. The peak wavelength and wavelength range of the ultraviolet light radiated by the ultraviolet LED are as described below.

From the viewpoint of improving the reaction efficiency of the chlorination reaction, the ultraviolet light radiated by the ultraviolet LED preferably has a peak wavelength of 290 nm or more and 400 nm or less, more preferably 315 nm or more and 400 nm or less, even more preferably 340 nm or more and 400 nm or less, and particularly preferably 350 nm or more and 400 nm or less. From the viewpoint of durability of the reactor, the ultraviolet light radiated by the ultraviolet LED preferably has a peak wavelength of 340 nm or more and 400 nm or less, more preferably 350 nm or more and 400 nm or less, even more preferably 355 nm or more and 395 nm or less, and particularly preferably 365 nm or more and 385 nm or less. The ultraviolet light having a peak wavelength of 315 nm or more and 400 nm or less is also called "UVA". As the ultraviolet LED, specifically, it is possible to use an ultraviolet LED that radiates ultraviolet light having a peak wavelength of 365 nm or an ultraviolet LED that radiates ultraviolet light having a peak wavelength of 385 nm.

It is preferable that the ultraviolet light radiated by the ultraviolet LED has a wavelength range of 260 nm or more and 430 nm or less, more preferably 300 nm or more and 420 nm or less, and even more preferably 305 nm or more and 400 nm or less. In the present invention, the term "the wavelength range of ultraviolet light" refers to the range of wavelengths having a relative emission intensity of 2% or more with respect to the relative emission intensity of the peak wavelength in the emission spectrum. For example, in the emission spectrum of ultraviolet light shown in FIG. 3, the wavelength range ranges from 350 nm to 392 nm.

From the viewpoint of reaction efficiency of the chlorination reaction, it is preferable to use an ultraviolet LED that radiates ultraviolet light having a wavelength range of 300 nm or more and 430 nm or less and a peak wavelength of 350 nm or more and 400 nm or less. It is more preferable to use an ultraviolet LED that radiates ultraviolet light having a wavelength range of 325 nm or more and 430 nm or less and a peak wavelength of 355 nm or more and 395 nm or less. It is even more preferable to use an ultraviolet LED that radiates ultraviolet light having a wavelength range of 330 nm or more and 430 nm or less and a peak wavelength of 365 nm or more and 385 nm or less. It is particularly preferable to use an ultraviolet LED that radiates ultraviolet light having a wavelength range of 350 nm or more and 392 nm or less and a peak wavelength of 365 nm.

The number of ultraviolet LEDs used in chlorination of polyvinyl chloride resin may be one or more. In the case where a plurality of ultraviolet LEDs are used, ultraviolet LEDs that each radiate ultraviolet light having the same peak wavelength may be combined, or ultraviolet LEDs that each radiate ultraviolet light having a different peak wavelength may be combined. The term "ultraviolet LED" used herein refers to both an ultraviolet LED element and an ultraviolet LED light source apparatus including a plurality of ultraviolet LED elements.

As the polyvinyl chloride resin used as a raw material for chlorinated polyvinyl chloride resin, it is possible to use a homopolymer of a vinyl chloride monomer, or a copolymer of a vinyl chloride monomer and another copolymerizable monomer. There is no particular limitation on the other copolymerizable monomer. Examples thereof include ethylene, propylene, vinyl acetate, allyl chloride, allyl glycidyl ether, acrylic acid ester, and vinyl ether.

In the case of a homopolymerization of a vinyl chloride monomer, or a copolymerization of a vinyl chloride monomer and another copolymerizable monomer, a dispersing agent, an oil-soluble polymerization initiator, and the like are used. A polymerization modifier, a chain transfer agent, a pH adjusting agent, an antistatic agent, a crosslinking agent, a stabilizing agent, a filler, an antioxidant, a scale inhibitor, and the like may also be used for the polymerization.

Examples of the dispersing agent include partially saponified polyvinyl acetate, methyl cellulose, and hydroxypropyl methyl cellulose. Examples of the oil-soluble polymerization initiator include lauroyl peroxide, di-2-ethylhexyl peroxyneodecanoate, t-butyl peroxyneodecanoate, and $\alpha,\alpha'$-azobis-2,4-dimethylvaleronitrile.

There is no particular limitation on the polyvinyl chloride resin, but it is preferable that the polyvinyl chloride resin has an average particle size of 0.1 µm or more and 350 µm or less, and more preferably 80 µm or more and 200 µm or less. In the present invention, the average particle size of the polyvinyl chloride resin is measured by using a particle size analyzer (product number MICROTRAC 9320-X1000) available from Honeywell Inc.

There is no particular limitation on the aqueous suspension of polyvinyl chloride resin, and the aqueous suspension of polyvinyl chloride resin can be obtained by, for example, mixing polyvinyl chloride resin with water so as to suspend polyvinyl chloride resin in water. The obtained aqueous suspension of polyvinyl chloride resin is put into a reactor and stirred by a stirring blade provided within the reactor. Chlorine is supplied to the stirred aqueous suspension of polyvinyl chloride resin during which ultraviolet light is radiated by the light source such as an ultraviolet LED provided in the reactor. The chlorination reaction of polyvinyl chloride resin starts by the start of ultraviolet radiation from the light source such as an ultraviolet LED.

The polyvinyl chloride resin in the aqueous suspension is chlorinated until a desired chlorine content is reached. The chlorination reaction stops as the ultraviolet radiation ends. After the chlorination reaction has stopped, unreacted chlorine in the chlorinated polyvinyl chloride resin is purged by using nitrogen or the like, and the hydrochloric acid remaining in the chlorinated polyvinyl chloride resin is removed by using water heated at a temperature less than or equal to Tg (glass transition temperature) of the chlorinated polyvinyl chloride resin. After that, dehydration and drying steps are performed, and chlorinated polyvinyl chloride resin is thereby obtained.

From the viewpoint of productivity, viscosity stability of aqueous suspension, and uniform mixing during stirring, the concentration of polyvinyl chloride resin in the aqueous suspension is preferably 10 wt % or more and 40 wt % or less, and more preferably 20 wt % or more and 35 wt % or less.

When chlorine is supplied to the reactor, the chlorine may be in the form of a gas or a liquid. From the viewpoint of ease of handling, the chlorine is preferably in the form of a gas. There is no particular limitation on the method for supplying chlorine as long as chlorine can be supplied to the aqueous suspension. Examples of the method for supplying chlorine include supplying chlorine at a time before the start of chlorination reaction, intermittently supplying chlorine during chlorination reaction, and continuously supplying chlorine during chlorination reaction. As described above, in the present invention, the chlorination reaction starts as ultraviolet radiation starts, and ends as the ultraviolet radiation ends.

There is no particular limitation on the highest reaction temperature during chlorination reaction, but the highest reaction temperature is preferably 90° C. or lower, more preferably 88° C. or lower, and even more preferably 86° C. or lower. With the highest reaction temperature being 90° C. or lower, degradation of polyvinyl chloride resin is suppressed, and coloration of the resulting chlorinated polyvinyl chloride resin is suppressed. The lowest reaction temperature during chlorination reaction is preferably above 0° C. from the viewpoint of facilitating the flow of the aqueous suspension by the stirring blade. From the viewpoint of shortening the reaction time, the lowest reaction temperature is preferably 30° C. or higher, and more preferably 50° C. or higher.

Because the chlorination reaction is an exothermic reaction, in order to control the internal temperature of the reactor, it is preferable that the reactor is equipped with a cooling jacket. By balancing the amount of heat removed and the amount of heat generated with the use of the cooling jacket, the internal temperature of the reactor is controlled. The stirring blade provided in the reactor may be an axial-type blade such as a propeller blade, or may be a radial-type blade such as a paddle blade, or a turbine blade.

As described above, the chlorinated polyvinyl chloride resin, obtained by chlorinating polyvinyl chloride resin at higher reaction efficiency than a photochlorination method using a mercury lamp by radiating ultraviolet light in a specific radiation direction in a reactor into which polyvinyl chloride resin and chlorine have been introduced by using at least one light source selected from the group consisting of an ultraviolet LED, an organic EL and an inorganic EL, and setting the amount of ultraviolet light radiated within a range of 30° or more and 115° or less with respect to the stirring direction of polyvinyl chloride resin to be 24% or more based on the total amount of ultraviolet light radiated from the light source taken as 100% has the same levels of mechanical strength and heat resistance as the chlorinated polyvinyl chloride resin produced by a conventional method of photochlorination using a mercury lamp.

In the present invention, the heat resistance of chlorinated polyvinyl chloride resin is evaluated by measuring the Vicat softening point by method B50 in accordance with JIS K 7206. If the value of the Vicat softening point is higher, it indicates that the heat resistance is higher. Evaluation of the heat resistance of chlorinated polyvinyl chloride resin will be described later in detail.

In the present invention, the mechanical strength of chlorinated polyvinyl chloride resin is evaluated by measuring tensile strength and Izod impact strength. The tensile strength is measured in accordance with JIS K 7161, and the Izod impact strength is measured in accordance with JIS K 7110. If the values of tensile strength and Izod impact strength are higher, it indicates that the mechanical strength is higher. Evaluation of the tensile strength and Izod impact strength of chlorinated polyvinyl chloride resin will be described later in detail.

EXAMPLES

Hereinafter, the present invention will be described in further detail by way of examples and comparative examples. However, it is to be noted that the present invention is not limited to the examples given below. Unless otherwise stated, the terms "part" and "%" used in the following examples and comparative examples are on the weight basis.

Example 1

Figure 3:
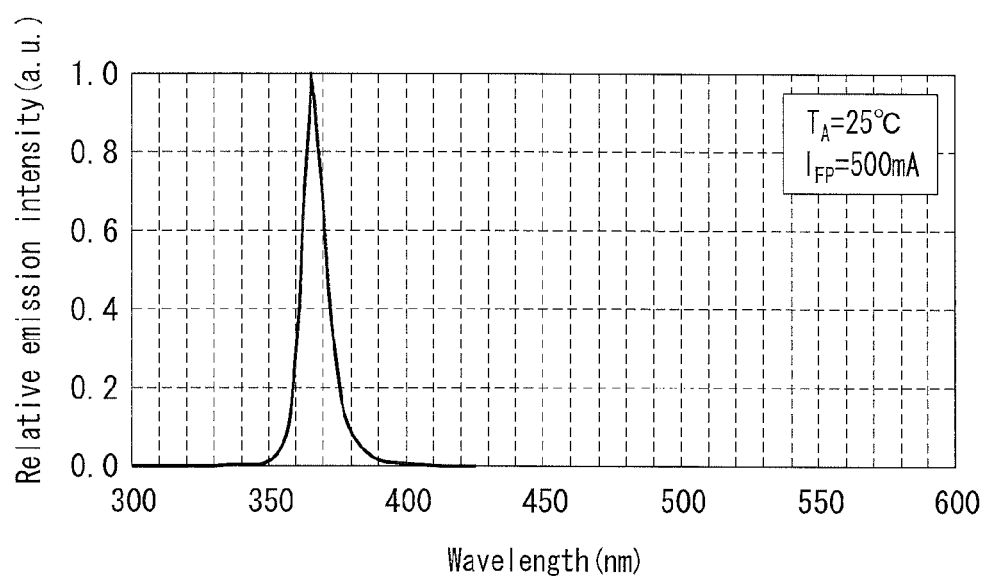
FIG. 3 is a graph showing the emission spectrum of an ultraviolet LED used in an example of the present invention.

First, as shown in FIG. 1, an ultraviolet LED light source apparatus 100 was prepared in which three ultraviolet LED elements 20 (product number NC4U133A available from Nichia Corporation, with a peak wavelength of 365 nm, a forward current of 620 mA, and a forward voltage of 14.9 V) were attached to a UV-LED light source unit 10 (model number OW-311 available from SENTEC Corp. Ltd.). The three ultraviolet LED elements 20 were vertically aligned in a line at a regular interval of 15 mm. The emission spectrum of the ultraviolet LED elements 20 was as shown in FIG. 3. As shown in FIG. 3, the ultraviolet light radiated from the ultraviolet LED elements 20 had a wavelength range of 350 nm to 392 nm, and a single peak wavelength of 365 nm.

Next, as shown in FIG. 1, the ultraviolet LED light source apparatus 100 was inserted into a cylindrical light source protective container 200 (PYREX®) made of transparent glass and having an inner diameter of 74 mm, a height of 600 mm and a thickness of 7 mm.

Figure 4A:
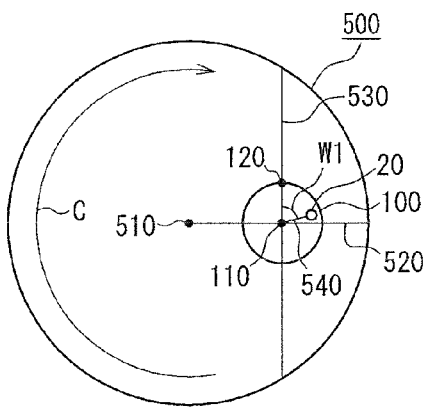
FIG. 4A is a schematic plan view showing the radiation direction of ultraviolet light in a chlorinated polyvinyl chloride resin producing apparatus used in Example 1 of the present invention.

Next, as shown in FIG. 1, the ultraviolet LED light source apparatus 100 housed in the cylindrical light source protective container 200 was placed in a cylindrical reactor 300 (with a capacity of 100 L) equipped with a jacket (not shown). To be specific, the ultraviolet LED light source apparatus 100 was placed such that a linear distance La between the central axis 330 of the cylindrical reactor 300 and the outer wall of the cylindrical light source protective container 200 was 170 mm, and a linear distance Lb between the inner wall of the cylindrical reactor 300 and the outer wall of the cylindrical light source protective container 200 was 25 mm. The ultraviolet LED light source apparatus 100 was placed also such that a linear distance Lc from the center portion of the three vertically aligned ultraviolet LED elements 20 to the bottom of the reactor 300 was 140 mm. At the same time, as shown in FIG. 4A, the ultraviolet LED elements 20 were disposed such that an angle W1 of the radiation direction of ultraviolet light with respect to the stirring direction of polyvinyl chloride resin was 75°.

Next, 40 kg of pure water and 10 kg of polyvinyl chloride resin (available from Kaneka Corporation) having a K value of 66.7, an average particle size of 170 μm and an apparent density of 0.568 g/ml were introduced into the reactor 300, and the reactor 300 was hermetically sealed with a lid 320. Then, an aqueous suspension 400 of polyvinyl chloride resin, which was a mixed solution of pure water and polyvinyl chloride resin, was stirred with a turbine blade 310 (with a diameter of 180 mm) in the reactor 300 at a rotation rate of 590 rpm.

After the reactor 300 had been subjected to vacuum degassing and nitrogen substitution, the reactor 300 was again subjected to vacuum degassing. Next, a chlorine gas was injected into the aqueous suspension 400 of polyvinyl chloride resin. At the same time, the aqueous suspension 400 of polyvinyl chloride resin was stirred with the turbine blade 310 during which ultraviolet light was radiated from the ultraviolet LED light source apparatus 100 (the ultraviolet LED elements 20) to the aqueous suspension 400 of polyvinyl chloride resin, thereby to start a chlorination reaction. The internal temperature of the reactor 300 was adjusted to 35° C. before the start of the chlorination reaction, then raised to 85° C. over 100 minutes after the start of the ultraviolet radiation, and the temperature was maintained at 85° C. during the subsequent chlorination reaction (during ultraviolet radiation).

When the chlorine content in the chlorinated polyvinyl chloride resin reached 67.1%, the ultraviolet radiation by the ultraviolet LED light source apparatus 100 (the ultraviolet LED elements 20) was finished to stop the chlorination reaction. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Example 2

Figure 4D:
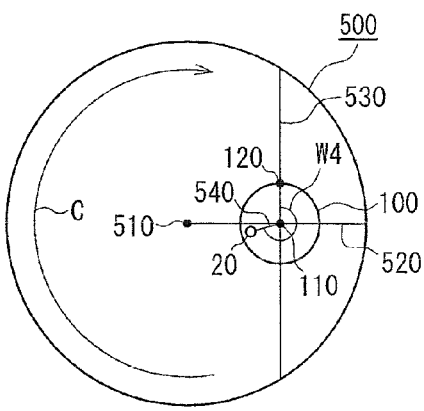
FIG. 4D is a schematic plan view showing the radiation direction of ultraviolet light in a chlorinated polyvinyl chloride resin producing apparatus used in Comparative Example 2 of the present invention.
Figure 4B:
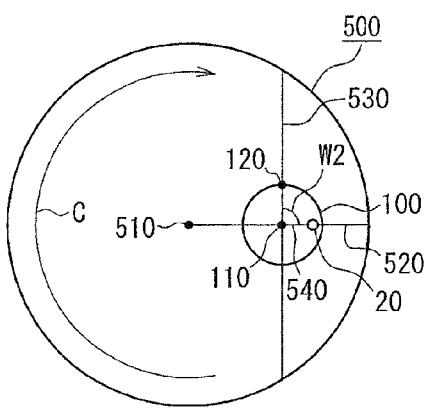
FIG. 4B is a schematic plan view showing the radiation direction of ultraviolet light in a chlorinated polyvinyl chloride resin producing apparatus used in Example 2 of the present invention.

A chlorination reaction was performed in the same manner as in Example 1 until the chlorine content in chlorinated polyvinyl chloride resin reached 67.1% except that as shown in FIG. 4B, the ultraviolet LED elements 20 were disposed such that an angle W2 of the radiation direction of ultraviolet light with respect to the stirring direction of polyvinyl chloride resin was 90°. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Comparative Example 1

Figure 4E:
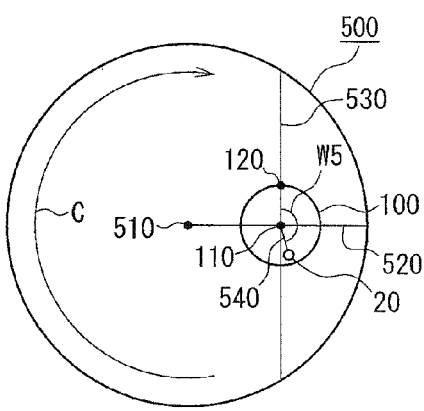
FIG. 4E is a schematic plan view showing the radiation direction of ultraviolet light in a chlorinated polyvinyl chloride resin producing apparatus used in Comparative Example 3 of the present invention.
Figure 4C:
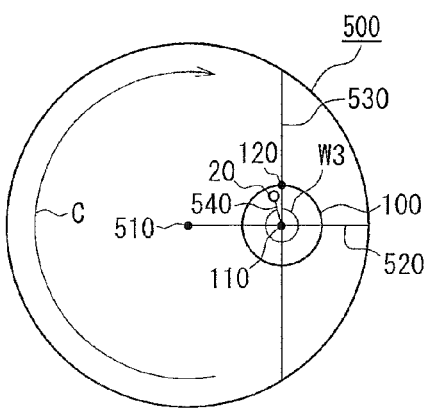
FIG. 4C is a schematic plan view showing the radiation direction of ultraviolet light in a chlorinated polyvinyl chloride resin producing apparatus used in Comparative Example 1 of the present invention.

A chlorination reaction was performed in the same manner as in Example 1 until the chlorine content in chlorinated polyvinyl chloride resin reached 67.1% except that as shown in FIG. 4C, the ultraviolet LED elements 20 were disposed such that an angle W3 of the radiation direction of ultraviolet light with respect to the stirring direction of polyvinyl chloride resin was 345°. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Comparative Example 2

A chlorination reaction was performed in the same manner as in Example 1 until the chlorine content in chlorinated polyvinyl chloride resin reached 67.1% except that as shown in FIG. 4D, the ultraviolet LED elements 20 were disposed such that an angle W4 of the radiation direction of ultraviolet light with respect to the stirring direction of polyvinyl chloride resin was 255°. Then, unreacted chlorine in the chlorinated polyvinyl chloride resin was purged with nitrogen, and thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Comparative Example 3

A chlorination reaction was performed in the same manner as in Example 1 until the chlorine content in chlorinated polyvinyl chloride resin reached 67.1% except that as shown in FIG. 4E, the ultraviolet LED elements 20 were disposed such that an angle W5 of the radiation direction of ultraviolet light with respect to the stirring direction of polyvinyl chloride resin was 165°. Then, unreacted chlorine in the chlorinated polyvinyl chloride resin was purged with nitrogen, and thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Comparative Example 4

Figure 4F:
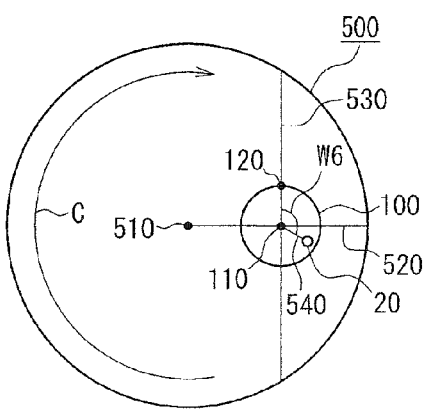
FIG. 4F is a schematic plan view showing the radiation direction of ultraviolet light in a chlorinated polyvinyl chloride resin producing apparatus used in Comparative Example 4 of the present invention.

A chlorination reaction was performed in the same manner as in Example 1 until the chlorine content in chlorinated polyvinyl chloride resin reached 67.1% except that as shown in FIG. 4F, the ultraviolet LED elements 20 were disposed such that an angle W6 of the radiation direction of ultraviolet light with respect to the stirring direction of polyvinyl chloride resin was 120°. Then, unreacted chlorine in the chlorinated polyvinyl chloride resin was purged with nitrogen, and thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

Comparative Example 5

A chlorination reaction was performed in the same manner as in Example 1 until the chlorine content in chlorinated polyvinyl chloride resin reached 67.1% except that instead of the ultraviolet LED light source apparatus 100, a 100 W high-pressure mercury lamp (product number SEH 1002 J01 available from Sun Energy Corporation, with a forward current of 1.1±0.1 A, and a forward voltage of 110±10 V) was used so as to perform omnidirectional ultraviolet radiation, and the high-pressure mercury lamp was placed such that the linear distance Lc from the center portion of the light emitting unit of the mercury lamp to the bottom of the reactor 300 was 140 mm. Then, unreacted chlorine in the chlorinated polyvinyl chloride resin was purged with nitrogen, and thereafter the remaining hydrochloric acid was removed by washing with water, and the chlorinated polyvinyl chloride resin was dried. Chlorinated polyvinyl chloride resin was obtained in this way. During the chlorination reaction, the chlorine content in the chlorinated polyvinyl chloride resin was measured for each reaction time (ultraviolet radiation time) of the chlorination reaction shown in Table 1 given below.

TABLE 1

| | | | | | | | | |
|---|---|---|---|---|---|---|---|---|
| Ex. 1 | Cl content (%) | 56.8 | 58.4 | 60.3 | 63.3 | 66.2 | 66.9 | 67.1 |
| | Reaction time (hr) | 0 | 0.5 | 1 | 2 | 4 | 4.5 | 4.65 |
| Ex. 2 | Cl content (%) | 56.8 | 58.7 | 60.5 | 63.4 | 65.2 | 66.4 | 67.1 |
| | Reaction time (hr) | 0 | 0.5 | 1 | 2 | 3 | 4 | 4.55 |
| Comp. Ex. 1 | Cl content (%) | 56.8 | 58.3 | 60.1 | 63.1 | 65.9 | 67 | 67.1 |
| | Reaction time (hr) | 0 | 0.5 | 1 | 2 | 4 | 5 | 5.1 |
| Comp. Ex. 2 | Cl content (%) | 56.8 | 58.2 | 59.9 | 62.9 | 65.7 | 66.7 | 67.1 |
| | Reaction time (hr) | 0 | 0.5 | 1 | 2 | 4 | 5 | 5.4 |
| Comp. Ex. 3 | Cl content (%) | 56.8 | 57.8 | 59.2 | 63.7 | 66.3 | 66.8 | 67.1 |
| | Reaction time (hr) | 0 | 0.5 | 1 | 3 | 5 | 5.5 | 5.8 |
| Comp. Ex. 4 | Cl content (%) | 56.8 | 58.1 | 59.8 | 62.3 | 66.0 | 66.8 | 67.1 |
| | Reaction time (hr) | 0 | 0.5 | 1 | 2 | 4 | 5.2 | 5 |
| Comp. Ex. 5 | Cl content (%) | 56.8 | 59.0 | 61.2 | 64.1 | 65.6 | 66.2 | 67.1 |
| | Reaction time (hr) | 0 | 0.5 | 1 | 2 | 4 | 5 | 5.25 |

Table 2 given below collectively shows the angle of the radiation direction of ultraviolet light with respect to the stirring direction of polyvinyl chloride resin (referred to simply as "radiation angle" in Table 2 given below) in Examples 1 and 2 and Comparative Examples 1 to 5. Table 2 also collectively shows the reaction time of the chlorination reaction required until the chlorine content reached 67.1% in Examples 1 and 2 and Comparative Examples 1 to 5.

Also, the total amount of ultraviolet light radiated from the light source and the amount of ultraviolet light in a specific radiation direction in Examples 1 and 2 and Comparative Examples 1 to 5 were measured and calculated in the following manner. A sensor (product number UD-36 available from Topcon Positioning Systems, Inc.) was attached to a light amount meter (product number UVR-2 available from Topcon Positioning Systems, Inc.), and the amount of ultraviolet light radiated in the radiation direction from the light source per unit area was measured at a position of the outer wall of the light source protective container at which the distance between the polyvinyl chloride resin present in the reactor and the light source was the shortest at the time of chlorination reaction. Also, the irradiated area where the ultraviolet light radiated from the ultraviolet LED element or the mercury lamp impinged on polyvinyl chloride resin was measured at the position of the outer wall of the light source protective container at which the distance between the polyvinyl chloride resin present in the reactor and the light source was the shortest at the time of chlorination reaction. The value obtained by multiplying the value of the irradiated area obtained by the above measurement by the value of the amount of ultraviolet light per unit area was defined as amount of light. In the above, the measurement of the amount of ultraviolet light per unit area and the irradiated area was performed in an air atmosphere and in the reactor in an empty state. Table 2 given below also shows the total amount of ultraviolet light radiated from the light source (hereinafter also referred to simply as "the total amount of light of the light source"), and the ratio of the amount of ultraviolet light radiated in a specific direction relative to 100% of the total amount of ultraviolet light radiated from the light source (hereinafter also referred to simply as "the proportion of the amount of light in a specific direction"). In the case where the light source is a mercury lamp, ultraviolet light is radiated in all directions (360°), and thus the amount of ultraviolet light radiated in a specific direction (30° to 115°) is 23.6% (=[(115°−30°)/360°]×100), where the total amount of ultraviolet light radiated from the light source is set to 100%.

TABLE 2

| | Radiation angle | Reaction time (hr) | Total amount of light of light source (mW) | Proportion of amount of light in specific direction (%) |
|---|---|---|---|---|
| Ex. 1 | 75° | 4.65 | 2768 | 100 |
| Ex. 2 | 90° | 4.55 | 2768 | 100 |
| Comp. Ex. 1 | 345° | 5.1 | 2768 | 0 |
| Comp. Ex. 2 | 255° | 5.4 | 2768 | 0 |
| Comp. Ex. 3 | 165° | 5.8 | 2768 | 0 |
| Comp. Ex. 4 | 120° | 5.2 | 2768 | 0 |
| Comp. Ex. 5 | All directions | 5.25 | 2798 | 23.6 |

As can be seen from the results shown in Tables 1 and 2 given above, when chlorinated polyvinyl chloride resin having the same chlorine content is produced by using polyvinyl chloride resin of the same composition in the examples and the comparative examples, the reaction time of chlorination reaction was shorter and the reaction efficiency of the chlorination reaction was higher in the examples than in comparative examples, including Comparative Example 5 that used a mercury lamp that radiated light in all directions. In other words, it was observed that when the total amount of light from the light source was substantially the same, the reaction efficiency of the chlorination reaction was increased by setting at least one radiation direction of ultraviolet light from the light source to be within a range of 30° or more and 115° or less with respect to the stirring direction of polyvinyl chloride resin and setting the total amount of ultraviolet light radiated within the range of 30° or more and 115° or less with respect to the stirring direction of polyvinyl chloride resin to be 24% or more based on the total amount of ultraviolet light radiated from the light source taken as 100%.

Samples for quality evaluation were produced in the following manner by using the chlorinated polyvinyl chloride resin obtained in Examples 1 and 2 and Comparative Examples 1 to 5, and heat resistance (Vicat softening point) and mechanical strength (Izod impact strength and tensile strength) were measured and evaluated. The results are shown in Table 3 given below.

<Production of Evaluation Samples>

Two parts of liquid tin-based stabilizing agent (product number TV # S8831 available from Nitto Kasei Co., Ltd.), 8 parts of methyl methacrylate butadiene styrene (MBS) resin (product number Kane Ace® B56 available from Kaneka Corporation), 1 part of stearic acid (product number LUNAC® S-90V available from Kao Corporation) and 0.3 parts of polyethylene wax (product number Hiwax 220 MP available from Mitsui Chemicals Inc.) were mixed with 100 parts by weight of chlorinated polyvinyl chloride resin, the resulting mixture was kneaded by a 8-inch roll kneader at 195° C. for 5 minutes, and 6 mm thick sheets were produced. After that, 15 of the obtained sheets were stacked one on top of another, and pressed at 200° C. with a pressure of 3 to 5 Pa for 10 minutes so as to produce a 5 mm thick plate. The obtained plates were used as evaluation samples in the following evaluations.

<Vicat Softening Point (Vicat)>

The Vicat softening point of chlorinated polyvinyl chloride resin was measured in accordance with JIS K 7206 by using the evaluation samples. In the measurement, the load was 5 kg, and the temperature increase rate was 50° C./h (method B50).

<Izod Impact Strength (Izod)>

The Izod impact strength of chlorinated polyvinyl chloride resin was measured in accordance with JIS K 7110 by using the evaluation samples. The measurement was performed at 23° C. by using a hammer energy of 2.75 J and forming a V-shaped notch.

<Tensile Strength>

The tensile strength of chlorinated polyvinyl chloride resin was measured by using a measurement apparatus (product number AG-X 20 kN available from SHIMAZU Corporation) in accordance with JIS K 7161. The size of the evaluation samples was ASTM D638-1. The measurement was performed by using an inter-chuck distance of 110 mm, an inter-mark distance of 50 mm, and a test speed of 5 mm/min. The maximum tensile stress was defined as tensile strength.

TABLE 3

| | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Vicat (° C.) | 118.2 | 118.5 | 118.6 | 119.0 | 118.4 | 118.8 | 118.4 |
| Izod (kJ/m$^2$) | 9.8 | 9.9 | 9.5 | 9.3 | 10.1 | 9.5 | 10.0 |
| Tensile strength (MPa) | 51.7 | 52.0 | 51.3 | 51.7 | 51.2 | 51.7 | 51.5 |

As can be seen from the results shown in Table 3 given above, the chlorinated polyvinyl chloride resin obtained in the examples had the same levels of quality such as heat resistance and mechanical strength as the chlorinated polyvinyl chloride resin obtained in the comparative examples, including Comparative Example 5 that used a mercury lamp. It was observed that chlorinated polyvinyl chloride resin having the same levels of mechanical strength and heat resistance as the chlorinated polyvinyl chloride resin produced through a photochlorination method using a mercury lamp can be obtained at high reaction efficiency by using an ultraviolet LED or the like as the light source, setting the radiation direction of ultraviolet light to be within a range of 30° or more and 115° or less with respect to the stirring direction of polyvinyl chloride resin, and setting the amount of ultraviolet light radiated within the range of 30° or more and 115° or less with respect to the stirring direction of polyvinyl chloride resin to be 24% or more based on the total amount of ultraviolet light radiated from the light source taken as 100%.

Example 3

A chlorination reaction was performed in the same manner as in Example 2 until the chlorine content in chlorinated polyvinyl chloride resin reached 67.1% except that the linear distance Lc from the center portion of the three vertically aligned ultraviolet LED elements 20 to the bottom of the reactor 300 was set to 90 mm. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in chlorinated polyvinyl chloride resin was measured for each reaction time (ultraviolet radiation time) of the chlorination reaction shown in Table 4 given below.

Example 4

A chlorination reaction was performed in the same manner as in Example 2 until the chlorine content in chlorinated polyvinyl chloride resin reached 67.1% except that the linear distance Lc from the center portion of the three vertically aligned ultraviolet LED elements 20 to the bottom of the reactor 300 was set to 190 mm. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in chlorinated polyvinyl chloride resin was measured for each reaction time (ultraviolet radiation time) of the chlorination reaction shown in Table 4 given below.

Comparative Example 6

A chlorination reaction was performed in the same manner as in Comparative Example 2 until the chlorine content in chlorinated polyvinyl chloride resin reached 67.1% except that the linear distance Lc from the center portion of the three vertically aligned ultraviolet LED elements 20 to the bottom of the reactor 300 was set to 90 mm. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in chlorinated polyvinyl chloride resin was measured for each reaction time (ultraviolet radiation time) of the chlorination reaction shown in Table 4 given below.

Comparative Example 7

A chlorination reaction was performed in the same manner as in Comparative Example 2 until the chlorine content in chlorinated polyvinyl chloride resin reached 67.1% except that the linear distance Lc from the center portion of the three vertically aligned ultraviolet LED elements 20 to the bottom of the reactor 300 was set to 190 mm. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. During the chlorination reaction, the chlorine content in chlorinated polyvinyl chloride resin was measured for each reaction time (ultraviolet radiation time) of the chlorination reaction shown in Table 4 given below.

TABLE 4

| Ex. 3 | Cl content (%) | 56.8 | 58.7 | 60.5 | 63.4 | 65.2 | 66.4 | 67.1 |
|---|---|---|---|---|---|---|---|---|
| | Reaction time (hr) | 0 | 0.5 | 1 | 2 | 3 | 4 | 4.5 |
| Ex. 4 | Cl content (%) | 56.8 | 58.7 | 60.5 | 63.4 | 65.2 | 66.4 | 67.1 |
| | Reaction time (hr) | 0 | 0.5 | 1 | 2 | 3 | 4 | 4.55 |
| Comp. Ex. 6 | Cl content (%) | 56.8 | 58.2 | 59.9 | 62.9 | 65.7 | 66.7 | 67.1 |
| | Reaction time (hr) | 0 | 0.5 | 1 | 2 | 4 | 5 | 5.35 |
| Comp. Ex. 7 | Cl content (%) | 56.8 | 58.2 | 59.9 | 62.9 | 65.7 | 66.7 | 67.1 |

As can be seen from the results shown in Tables 1, 2 and 4 given above, in Example 2 to 4 in which only the vertical distance from the ultraviolet LED to the bottom of the reactor was varied, the reaction time of chlorination reaction required to produce chlorinated polyvinyl chloride resin having the same chlorine content was substantially the same. Also, in Comparative Examples 2, 6 and 7 in which only the vertical distance from the ultraviolet LED to the bottom of the reactor was varied, the reaction time of chlorination reaction required to produce chlorinated polyvinyl chloride resin having the same chlorine content was substantially the same.

Samples for quality evaluation were produced in the above-described manner by using the chlorinated polyvinyl chloride resin obtained in Examples 3 and 4 and Comparative Examples 6 and 7, and heat resistance (Vicat softening point) and mechanical strength (Izod impact strength and tensile strength) were measured and evaluated. The results are shown in Table 5 given below.

TABLE 5

| | Ex. 3 | Ex. 4 | Comp. Ex. 6 | Comp. Ex. 7 |
|---|---|---|---|---|
| Vicat (° C.) | 118.5 | 118.3 | 118.4 | 118.8 |
| Izod (kJ/m$^2$) | 9.2 | 9.0 | 9.6 | 9.2 |
| Tensile strength (MPa) | 51.8 | 51.2 | 51.0 | 51.4 |

As can be seen from the results shown in Tables 3 and 5 given above, the chlorinated polyvinyl chloride resin obtained in Examples 3 and 4 had the same levels of quality such as heat resistance and mechanical strength as the chlorinated polyvinyl chloride resin obtained in Comparative Example 5 that used a mercury lamp.

Example 5

Figure 5A:
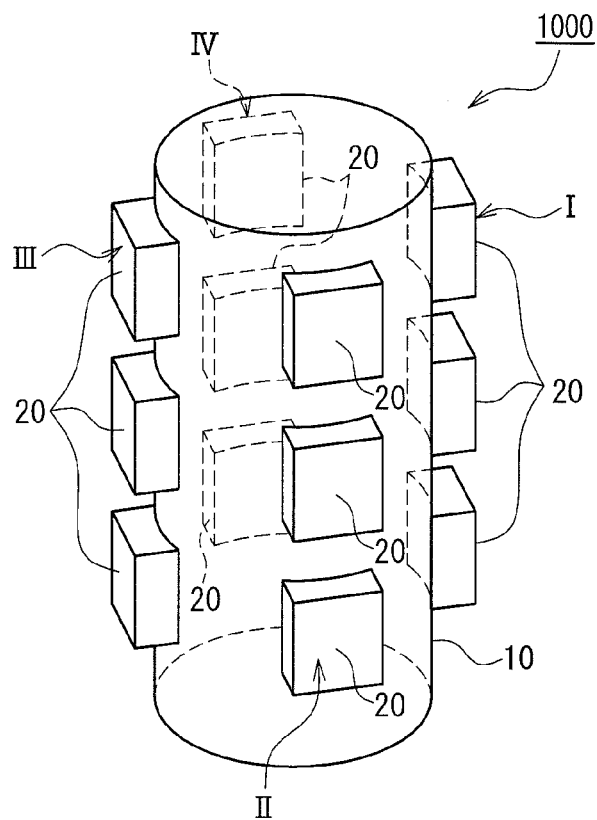
FIG. 5A is a schematic perspective view of a light source used in an example of the present invention.
Figure 5B:
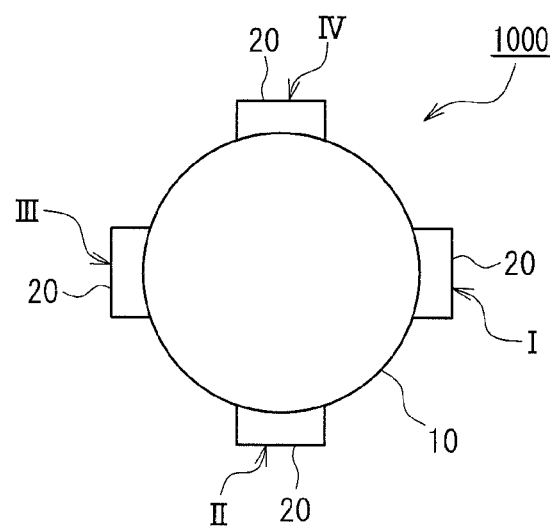
FIG. 5B is a schematic plan view of the same.

Instead of the ultraviolet LED light source apparatus 100 used in Example 1, an ultraviolet LED light source apparatus 1000 as shown in FIGS. 5A and 5B was used in which ultraviolet LED elements 20 (product number NC4U133A available from Nichia Corporation, with a peak wavelength of 365 nm, a forward current of 620 mA, and a forward voltage of 14.9 V) were attached to a UV-LED light source unit 10 (model number OW-311 available from SENTEC Corp. Ltd.) in four directions at an interval of 90°. In each of the directions I, II, III and IV, three ultraviolet LED elements 20 were vertically aligned in a line at a regular interval of 15 mm. The emission spectrum of the ultraviolet LED elements 20 was as shown in FIG. 3. As shown in FIG. 3, the ultraviolet light radiated from the ultraviolet LED elements 20 had a wavelength range of 350 nm to 392 nm, and a single peak wavelength of 365 nm.

Next, as shown in FIG. 6, the ultraviolet LED light source apparatus 1000 was inserted into a cylindrical light source protective container 200 (PYREX®) made of transparent glass and having an inner diameter of 74 mm, a height of 600 mm and a thickness of 7 mm.

Next, as shown in FIG. 6, the ultraviolet LED light source apparatus 1000 housed in the cylindrical light source protective container 200 was placed in a cylindrical reactor 300 (with a capacity of 100 L) equipped with a jacket (not shown). To be specific, the ultraviolet LED light source apparatus 1000 was placed such that the linear distance La between the central axis 330 of the cylindrical reactor 300 and the outer wall of the cylindrical light source protective container 200 was 170 mm, and the linear distance Lb between the inner wall of the cylindrical reactor 300 and the outer wall of the cylindrical light source protective container 200 was 25 mm. Also, the ultraviolet LED light source apparatus 1000 was placed such that the linear distance Lc from the center portion of the three vertically aligned ultraviolet LED elements 20 to the bottom of the reactor 300 was 140 mm. At the same time, the ultraviolet LED elements 20 in the direction I were disposed such that the angle of the radiation direction of ultraviolet light with respect to the stirring direction of polyvinyl chloride resin was 75°.

Next, 40 kg of pure water and 10 kg of polyvinyl chloride resin (available from Kaneka Corporation) having a K value of 66.7, an average particle size of 170 µm and an apparent density of 0.568 g/ml were introduced into the reactor 300, and the reactor 300 was hermetically sealed with a lid 320. Then, an aqueous suspension 400 of polyvinyl chloride resin, which was a mixed solution of pure water and polyvinyl chloride resin, was stirred with a turbine blade 310 (with a diameter of 180 mm) in the reactor 300 at a rotation rate of 590 rpm.

After the reactor 300 had been subjected to vacuum degassing and nitrogen substitution, the reactor 300 was again subjected to vacuum degassing. Next, a chlorine gas was injected into the aqueous suspension 400 of polyvinyl chloride resin. At the same time, the aqueous suspension 400 of polyvinyl chloride resin was stirred with the turbine blade 310 during which in the ultraviolet LED light source apparatus 1000, the lower ultraviolet LED elements 20 in the directions II, III and IV, and the lower, middle and upper ultraviolet LED elements 20 in the direction I were illuminated so as to radiate ultraviolet light to the aqueous suspension 400 of polyvinyl chloride resin to start a chlorination reaction. The internal temperature of the reactor 300 was adjusted to 35° C. before the start of the chlorination reaction, then raised to 85° C. over 100 minutes after the start of the ultraviolet radiation, and the temperature was maintained at 85° C. during the subsequent chlorination reaction (during ultraviolet radiation).

When the chlorine content in chlorinated polyvinyl chloride resin reached 67.1%, the ultraviolet radiation by the ultraviolet LED light source apparatus 1000 (the ultraviolet LED elements 20) was finished to stop the chlorination reaction. Then, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. The reaction time of chlorination reaction (ultraviolet radiation time) required until the chlorine content in chlorinated polyvinyl chloride resin reached 67.1% was measured.

Comparative Example 8

A chlorination reaction was performed in the same manner as in Example 5 until the chlorine content in chlorinated polyvinyl chloride resin reached 67.1% except that in the ultraviolet LED light source apparatus 1000, the lower ultraviolet LED elements 20 in the directions I, II and III, and the lower, middle and upper ultraviolet LED elements 20 in the direction W were illuminated so as to radiate ultraviolet light to the aqueous suspension 400 of polyvinyl chloride resin to start the chlorination reaction. After the chlorination reaction had ended, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. The reaction time of chlorination reaction (ultraviolet radiation time) required until the chlorine content in chlorinated polyvinyl chloride resin reached 67.1% was measured.

Comparative Example 9

A chlorination reaction was performed in the same manner as in Example 5 until the chlorine content in chlorinated polyvinyl chloride resin reached 67.1% except that in the ultraviolet LED light source apparatus 1000, the lower ultraviolet LED elements 20 in the directions I, II and IV, and the lower, middle and upper ultraviolet LED elements 20 in the direction III were illuminated so as to radiate ultraviolet light to the aqueous suspension 400 of polyvinyl chloride resin to start the chlorination reaction. After the chlorination reaction had ended, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. The reaction time of chlorination reaction (ultraviolet radiation time) required until the chlorine content in chlorinated polyvinyl chloride resin reached 67.1% was measured.

Comparative Example 10

A chlorination reaction was performed in the same manner as in Example 5 until the chlorine content in chlorinated polyvinyl chloride resin reached 67.1% except that in the ultraviolet LED light source apparatus 1000, the lower ultraviolet LED elements 20 in the directions I, III and IV, and the lower, middle and upper ultraviolet LED elements 20 in the direction II were illuminated so as to radiate ultraviolet light to the aqueous suspension 400 of polyvinyl chloride resin to start the chlorination reaction. After the chlorination reaction had ended, unreacted chlorine in the chlorinated polyvinyl chloride resin was purged with nitrogen, thereafter the remaining hydrochloric acid was removed by washing with water, and the chlorinated polyvinyl chloride resin was dried. Chlorinated polyvinyl chloride resin was obtained in this way. The reaction time of chlorination reaction (ultraviolet radiation time) required until the chlorine content in chlorinated polyvinyl chloride resin reached 67.1% was measured.

In Example 5 and Comparative Examples 8 to 10, six ultraviolet LED elements 20 were illuminated. In other words, the number of ultraviolet LED elements used in ultraviolet radiation was 6. Table 6 given below shows the number of ultraviolet LED elements illuminated in each attachment direction (hereinafter also referred to simply as "attachment direction") of the light source in Example 5 and Comparative Examples 8 to 10. Table 6 also shows the angle of the radiation direction of ultraviolet light radiated by the ultraviolet LED element with respect to the stirring direction of polyvinyl chloride resin (hereinafter also referred to simply as "radiation angle") in Example 5 and Comparative Examples 8 to 10.

TABLE 6

|  | Attachment direction | Radiation angle | Ex. 5 | Comp. Ex. 8 | Comp. Ex. 9 | Comp. Ex. 10 |
|---|---|---|---|---|---|---|
| Number of illuminated ultraviolet LED elements | I | 75° | 3 | 1 | 1 | 1 |
| | II | 165° | 1 | 1 | 1 | 3 |
| | III | 255° | 1 | 1 | 3 | 1 |
| | IV | 345° | 1 | 3 | 1 | 1 |

In Example 5 and Comparative Examples 8 to 10, the amount of ultraviolet light in each radiation direction and the total amount of ultraviolet light radiated from the light source were measured and calculated in the above-described manner. Table 7 given below shows the amount of ultraviolet light in each radiation direction, the total amount of ultraviolet light radiated from the light source (hereinafter also referred to simply as "the total amount of light of the light source"), and the ratio of the amount of ultraviolet light radiated in a specific direction relative to 100% of the total amount of ultraviolet light radiated from the light source (hereinafter also referred to simply as "the proportion of the amount of light in a specific direction"). Table 7 given below also shows the reaction time of the chlorination reaction required until the chlorine content in chlorinated polyvinyl chloride resin reached 67.1% in Example 5 and Comparative Examples 8 to 10.

TABLE 7

|  | Attachment direction | Radiation angle | Ex. 5 | Comp. Ex. 8 | Comp. Ex. 9 | Comp. Ex. 10 |
|---|---|---|---|---|---|---|
| Amount of ultraviolet light in each radiation direction (mW) | I | 75° | 2768 | 900 | 900 | 900 |
|  | II | 165° | 900 | 900 | 900 | 2768 |
|  | III | 255° | 900 | 900 | 2768 | 900 |
|  | IV | 345° | 900 | 2768 | 900 | 900 |
| Total amount of light of light source (mW) |  |  | 5468 | 5468 | 5468 | 5468 |
| Proportion of amount of light in specific direction (%) |  |  | 50.6 | 16.5 | 16.5 | 16.5 |
| Reaction time (hr) |  |  | 3.2 | 3.4 | 3.4 | 3.4 |

From Table 7 given above, it was observed that in Example 5 and Comparative Examples 8 to 10 in which the total amount of light of the light source was the same, the reaction efficiency of the chlorination reaction increased in Example 5 in which the proportion of the amount of light in a specific direction was 24% or more, as compared to Comparative Examples 8 to 10 in which the proportion of the amount of light in a specific direction was less than 24%.

DESCRIPTION OF REFERENCE NUMERALS

10 UV-LED light source unit
20 Ultraviolet LED element
100, 1000 Ultraviolet LED light source apparatus (light source)
110 Center point of light source
120 Reference for angle of radiation direction of ultraviolet light with respect to stirring direction of polyvinyl chloride resin
200 Light source protective container
300 Reactor
310 Turbine blade
320 Lid
330 Central axis of reactor
400 Aqueous suspension of polyvinyl chloride resin
500 Cross section that is perpendicular to central axis of reactor and passes through center point of light source
510 Center point of cross section that is perpendicular to central axis of reactor and passes through center point of light source
520 Straight line connecting center point of cross section that is perpendicular to central axis of reactor and passes through center point of light source and center point of light source
530 Light source center line
540 Straight line connecting center point of light source and ultraviolet LED element

The invention claimed is:

1. A method for producing chlorinated polyvinyl chloride resin in which polyvinyl chloride resin is chlorinated by radiating ultraviolet light in a reactor into which polyvinyl chloride resin and chlorine have been introduced,
wherein the radiation of the ultraviolet light is performed by using at least one light source selected from the group consisting of an ultraviolet LED, an organic EL and an inorganic EL,
the light source is housed in a container disposed within the reactor and placed between a center of the reactor and an inner wall of the reactor so that there is a distance between both (i) the center of the reactor and an outer wall of the container and (ii) the inner wall of the reactor and the outer wall of the container,
the light source radiates the ultraviolet light in a direction away from the center of the reactor toward the inner wall of the reactor so that at least one radiation direction of the ultraviolet light is within a range of 30° or more and 115° or less with respect to a stirring direction of polyvinyl chloride resin,
an amount of ultraviolet light radiated in the direction away from the center of the reactor within the range of 30° or more and 115° or less with respect to the stirring direction of polyvinyl chloride resin is 24% or more based on a total amount of ultraviolet light radiated from the light source taken as 100%, and
the ultraviolet light radiated by the light source has a peak wavelength range of 290 nm or more and 400 nm or less.

2. The method for producing chlorinated polyvinyl chloride resin according to claim 1,
wherein the ultraviolet light radiated by the light source has a peak wavelength range of 350 nm or more and 400 nm or less.

3. The method for producing chlorinated polyvinyl chloride resin according to claim 2,
wherein the light source is an ultraviolet LED.

4. The method for producing chlorinated polyvinyl chloride resin according to claim 3,
wherein supply of chlorine to the polyvinyl chloride resin is performed by supply of chlorine to an aqueous suspension of polyvinyl chloride resin.

5. The method for producing chlorinated polyvinyl chloride resin according to claim 2,
wherein supply of chlorine to the polyvinyl chloride resin is performed by supply of chlorine to an aqueous suspension of polyvinyl chloride resin.

6. The method for producing chlorinated polyvinyl chloride resin according to claim 1,
wherein the light source is an ultraviolet LED.

7. The method for producing chlorinated polyvinyl chloride resin according to claim 6,
wherein supply of chlorine to the polyvinyl chloride resin is performed by supply of chlorine to an aqueous suspension of polyvinyl chloride resin.

8. The method for producing chlorinated polyvinyl chloride resin according to claim 1,
wherein supply of chlorine to the polyvinyl chloride resin is performed by supply of chlorine to an aqueous suspension of polyvinyl chloride resin.

9. The method for producing chlorinated polyvinyl chloride resin according to claim 1, wherein the ultraviolet light radiated by the light source has a peak wavelength range of 290 nm or more and 385 nm or less.

10. The method for producing chlorinated polyvinyl chloride resin according to claim 1, wherein the ultraviolet light radiated by the light source has a peak wavelength range of 350 nm or more and 380 nm or less.

\* \* \* \* \*